United States Patent Office 3,087,829
Patented Apr. 30, 1963

3,087,829
MICACEOUS PIGMENT COMPOSITION
Howard R. Linton, Scotch Plains, N.J., assignor to E. I. du Pont de Nemours and Company, Wilmington, Del., a corporation of Delaware
No Drawing. Filed June 28, 1961, Ser. No. 120,177
12 Claims. (Cl. 106—291)

This invention relates to new pigment compositions.

There are many types of pigments recognized in the prior art. Among such pigments, attention may be drawn to the opaque, high hiding power pigments typified, for instance, by titanium dioxide as a white pigment and by the various iron oxides as colored pigments. It is well recognized that the particle size of such pigments has a profound effect upon their value as pigments, as exhibited in the appearance of compositions in which these pigments are dispersed. Such pigments are generally composed of small irregular particles which behave as small spheres in their interaction with light. To achieve the optimum of opacity and hiding power, the particle size of such pigments is controlled to result in the maximum scattering of the incident light by coating compositions containing these pigments. It has been shown by both theoretical calculations and by practical tests that a curve relating the light scattering function to particle size rises very sharply as the particle size increases from about 0.1 micron to about 0.2 micron. There is a narrow range of maximum scattering (from about 0.2 to 0.3 micron) and then a rather abrupt drop in scattering power as the particle size increases further.

Thus, the optical units of prior art high hiding colored and white pigments are generally particles of irregular shape which refract and scatter light much like spheres of very small size, in the order of 0.2 to 0.3 micron in diameter. A light beam which falls upon a surface pigmented with such optical units is refracted by each particle it encounters in a completely random manner and the light is ultimately, in effect, reflected from the film in a random scattering. In the case of colored pigments, some of the wave lengths of light are absorbed so that the reflected light is composed of the remaining wave lengths of light and is thereby colored. In the prior art manufacture of such pigments, it has been a principal aim to maximize the random light scattering by control of particle size and shape.

Another class of pigments widely used in the prior art may be designated under the general term "flake pigments." In one of the oldest uses of such pigments, the flakes are used as reinforcing and protective pigments wherein the flake-like particles are oriented in a leafing or overlapping fashion, more or less parallel to the surface of the paint or other film and thus create a physical barrier to the penetration of the film by deleterious agents as well as providing a reinforcing effect. Water ground white mica in small sizes (200–325 mesh) has been widely used for this purpose. It is substantially colorless and its refractive index (about 1.55) is essentially the same as that of the common paint vehicles, thus it has a negligible effect on the visual properties of the film. However, when used in low refractive index vehicles or when partially exposed to the air, mica has a reflective and sparkling effect and has, on some occasions, been used for this effect.

Atwood in U.S. 2,278,970 has combined the reinforcing effect of mica with the high hiding power properties of other pigments such as titanium dioxide to give a composite pigment which is said to be an intimate association of mica with another pigment, exhibiting the general properties of the second pigment, but without the sparkling effect of the mica. Atwood specifically describes a physical mixture of a titanium dioxide pigment with mica to give the type of product which he desires and he suggests that similar products could be obtained by a precipitation of this and other pigments on the mica. Although he does not specifically describe any method of precipitation, only products which meet the particle size requirement of such high hiding power pigments could possibly fulfill the properties which he specifies and, therefore, it must be assumed that Atwood prepared mixtures of pigments in the particle size range of 0.2 to 0.3 micron with the mica in the specified sizes which he proposes to use.

Other types of flake pigments include metal flakes, especially aluminum in various particle sizes. They have been used both for the purpose of reinforcing effects and for the essentially opaque character and shiny surfaces of such flakes giving a film with the appearance of a metal surface.

Metal flake pigments, such as aluminum, have also found wide use because of their decorative effect, especially when mixed with other pigments, to give the well-known "metallized" appearance of many automotive finishes. Despite their desirable appearance, such metallized finishes have certain well recognized defects, including a tendency to water spot, which is a persistent discoloration of the finish when water is allowed to stand on it in drops, especially when the water is slightly alkaline as from a detergent. It is also common to find that a mixture of aluminum flakes with a colored pigment is less lightfast than the colored pigment alone.

A third and more specialized use of certain flake pigments is to create finishes with a nacreous or pearl-like effect simulating the appearance of mother of pearl with its three dimensional effect of luster in the depth of the film. Pigments having this effect are non-opaque with a high refractive index and vary in nature from an extract of fish scales, essentially the organic compound guanine, to flake-like crystals of certain inorganic salts notably basic lead carbonate and lead acid phosphate. In spite of their valuable decorative properties, these products have well recognized deficiencies such as:

(1) They cannot, in general, be handled in dry form but must be stored and marketed as dispersions in the selected vehicles in which they will be used.

(2) Their lightfastness does not meet the demands of many outdoor uses.

(3) They are inherently very expensive to manufacture.

(4) The presence of lead compounds is frowned upon in many potential uses.

This invention provides a new group of colored nacreous flake pigments which can be marketed in a dry, easily dispersible form, which have excellent lightfastness and are relatively low in cost. They are capable of being formulated to give very desirable nacreous effects and, moreover, these products exhibit pronounced color in addition to their nacreous character, the color being derived in part from an inherent color and in part from the optical phenomenon of interference. Furthermore, these products may also be formulated to simulate a metallized appearance completely free from the water spotting so characteristic of finishes based on aluminum flakes. Finally, since they are flake-like in nature and chemically stable, they have the added ability to serve as reinforcing pigments.

All pigments exhibiting nacreous effects when dispersed in vehicles have certain common optical and physical characteristics which set them apart sharply from the usual colored pigments and white pigments of commerce. Instead of the irregular, more or less spherical particles of the prior art pigments described above, nacreous pigments are non-opaque flake-like products in which the optical units are extremely thin flakes, at least about 5 to 10 microns in diameter and in the range of about 0.1 to 3 microns in thickness. Such optical units minimize the scattering of light and result in direct reflectance or sparkle.

Furthermore, all nacreous pigments must be transparent or translucent in character and they must exhibit a substantial difference in refractive index from the medium in which they are dispersed. Thus, the common coating composition vehicles, plastics, and the like have refractive indices generally in the range of about 1.5 to 1.6. Those pigments which have been known in the prior art as nacreous pigments have, in general, refractive indices in the range of about 1.8 to 2.6. They exist for the most part as thin flakes of a definite chemical compound and are generally uniform throughout. These thin flakes, in the presence of a vehicle of low refractive index, exhibit the optical behavior of thin films including light interference and a resultant interference color characteristic of the thickness of the film. However, the prior art flakes exhibit more or less random thicknesses and the average effect is a blending of colors to give a nacreous or pearl-like appearance almost free of distinguishable color.

The optical principles which explain interference colors are well-known and are discussed in many textbooks of physical optics such as, Robert W. Wood, "Physical Optics, 3rd edition," New York, 1936, page 198. Briefly summarized, interference is an optical phenomenon associated with the reflectance of light from the surfaces of thin films, wherein there is a reduction in the intensity of certain wave lengths of the incident light (destructive interference) and reinforcement of other wave lengths (constructive interference). The particular wave lengths affected are dependent upon the thickness of the film and its refractive index. When the thickness is such that a ray reflected from one surface of a film is out of phase with a ray which has passed through the film and been reflected from the other surface, there is destructive interference.

Since there is a phase reversal when light is reflected from a more dense medium, the condition of maximum destructive interference (minimum reflectance) is satisfied when the effective optical path in a film of high refractive index is one wave length or a simple multiple thereof. Considering the refractive index, "N," of the film, the thickness ($t$) thereof for destructive interference with any wave length "$\lambda$" is given by the formula $$t = \frac{n\lambda}{2N}$$

where "$n$" is a small whole number usually not greater than 5.

By the same line of reasoning, if the two rays emerge in phase, there is reinforcement or a maximum of reflectance. This condition is satisfied, again assuming phase reversal, when the effective optical path is one half a wave length or an odd multiple thereof, the formula for the thickness at maximum reflectance being $$t = (n + 1/2)\frac{\lambda}{2N}$$

where "$n$" is 0 or a small whole number usually not greater than about 5.

When "$n$" is greater than 1, it is common to speak of the interference as a higher order, second order, third order, and the like.

It is now found that a thin, adherent, translucent layer of certain colored metal oxides of a selected small particle size can be deposited in a preferred oriented arrangement on the smooth surface of a translucent flake pigment, such as mica, to give a hitherto unknown family of colored nacreous flake pigments which are relatively free from random scattering of light and which exhibit both the inherent color of the metal oxide and a reflex color derived from the optical phenomenon of interference.

When dispersed in a conventional manner as pigments in various systems, the compositions so obtained exhibit color effects hitherto unobtainable which include the inherent color of the metal oxide and, superimposed thereupon, a brilliant nacreous luster. Moreover, when such compositions are viewed at the specular angle under bright illumination, as in the sunlight, they exhibit a striking iridescent sparkle on the background of the predominating color of the metal oxide.

The new nacreous flake pigments of this invention comprise two parts—(1) a non-opaque flake substrate, and (2) a thin, adherent, translucent layer of colored metal oxide of selected small particle size deposited thereon which metal oxide is selected from the groups of iron (III) oxide, chromium (III) oxide, vanadium (V) oxide, and the hydrous oxides of iron (III) and chromium (III).

In a preferred embodiment of this invention, the non-opaque flake substrate is a flake-like micaceous mineral, usually muscovite mica, in a selected particle size range. Such flake substrates useful for the purposes of this invention are particles which have two dimensions (length and width) of similar magnitude and characteristically much greater than the third dimension. Specifically, the preferred flakes of this invention are at least about 5 to 10 microns in a major dimension and in the range of about 0.05 to 1.0 micron in thickness. For most pigment purposes, the upper limit in the major dimension is from 50 to 100 microns. However, for specialized uses such as in plastic articles of appreciable thickness, linoleum, and the like, larger flakes up to as much as 1 mm. length may be used for special decorative effects. The lower limit in thickness of the mica flake is determined to a large extent by the physical strength of the flake and may be as little as 0.05 micron or even less, while an upper limit of about 3.0 microns, accompanied by a correspondingly greater length and width, is fixed by the effect on the coating composition surfaces. Such flakes must also be substantially planar with a relatively smooth and light reflecting surface and must be insoluble in either water or organic solvents and inert thereto.

A satisfactory grade of mica is a water ground white mica, frequently used as a reinforcing extender pigment in paint, all of which passes through a 200 mesh screen and about 90% through a 325 mesh screen. A mica pigment meeting ASTM specification D–607–42 is a preferred grade. However, for specialized purposes, it is quite possible to use flakes which are in the 140 mesh to 200 mesh range on the one hand as well as material which is considerably finer, approaching the 400 mesh size or even finer.

Another measure of particle size, more readily correlated in many ways with the application of the subsequent metal oxide film to the surface, is the specific surface area as measured by gas adsorption using the well-known BET method. This function has been found to vary appreciably from batch to batch of nominally similar sized micas. Mica with a surface area of about 3 square meters per gram and with a reasonably uniform particle size is a particularly suitable form. However, products of acceptable properties may be obtained from samples of mica with widely differing surface areas provided appropriate adjustments are made in the amount of metal oxide applied to form the transparent layers thereon so that the use of metal oxide per unit of surface area is appropriately controlled. No arbitrary limits on surface area can be established, but a range from about 2 sq. meters per gram to about 7 sq. meters per gram will encompass the products most likely to be desired.

In addition to muscovite mica, other forms of mica such as biotite, phlogopite, the related vermiculite and various synthetic micas may be used as substrates in this invention. To obtain these products in the desired particle size ranges, it is preferred that they also be water ground. The introduction of agents to facilitate exfoliation or the introduction of other inert coatings which do not materially alter the refractive index nor the receptivity of the mica to the subsequently applied translucent layer of metal oxide are contemplated as yielding mica flakes of equivalent value as substrates in this invention.

The preferred materials for the thin translucent layer of metal oxide deposited upon the mica substrates are selected from the group of oxides consisting of iron (III) oxide, chromium (III) oxide, vanadium (V) oxide, and the hydrous oxides of iron (III) and chromium (III), the particles of which are less than about 0.1 micron in diameter. Such layers of oxides, as the hydrous forms (the hydrous vanadium oxide being a vanadium (IV) oxide) are conveniently deposited upon mica substrates by suspending the mica in acidic solutions of the appropriate metal salts and bringing about a carefully controlled hydrolysis at such a rate that the mica flakes are able to function as nuclei for the formation of hydrous oxide films on their surfaces. The exact physical conditions to bring about this slow formation of the hydrous oxide vary somewhat among the metals involved. For instance, it is preferred in the case of the iron oxide to add a substantial amount of acetate ion to a solution of a ferric salt and to bring about the hydrolysis by a cautious heating of the resulting solutions.

On the other hand, other buffer salts are preferred in the preparation of the chromic and vanadium oxides, which may be done without heating by the addition of a solution of a suitable buffer salt at room temperature, the buffer being so selected that it brings about the desired pH for hydrous oxide formation at a relatively slow rate. Such a process may also be used in depositing hydrous iron oxide on mica. A preferred agent to be used in this case is borax ($Na_2B_4O_7 \cdot 10H_2O$). It is preferred to add the borax in small increments so that the pH is maintained in the desired range as more fully set forth in the examples below.

Mica flakes coated with these hydrous oxides, and particularly with the hydrous iron oxide, exhibit desirable tinctorial properties which are characteristic of the oxides themselves, together with interference colors which vary with the amount of oxide precipitated. It is also possible, and in many cases preferred, to calcine these products at temperatures which may vary widely, say up to about 900° C., to obtain products exhibiting different colors more or less characteristic of the oxides as calcined in these temperature ranges and also exhibiting various degrees of interference color depending both upon the amount of oxide present and upon the temperature of calcination. It is especially significant that the vanadium oxide, when calcined in air, appears to be converted to a higher oxide by oxidation, resulting in markedly different and very desirable colors in the yellow range under these conditions.

The specific metal salts chosen to prepare the products of this invention are not critical as to the anion present, the choice being generally dictated by availability. In the precipitation of an iron (III) oxide, it is common to work with $FeCl_3$ as an available crystalline material. However, it is equally feasible to use a ferric sulfate solution which might be obtained for instance by oxidation of a solution of ferrous sulfate (copperas). Other water soluble iron (III) salts, as available, can also be used.

Likewise, in the choice of a chromium salt, it is common to use a chromic sulfate solution obtained by reduction of the readily available sodium or potassium dichromate solutions. Another commonly available salt is chromic chloride.

A commonly available vanadium salt is vanadyl sulfate ($VOSO_4$), a tetravalent vanadium derivative. Generally speaking, the simple vanadium salts are decomposed in water so the latter must be used.

The stable water solutions of these salts are strongly acidic in character and hydrous oxides are precipitated when the acidity is neutralized. For the purposes of this invention, wherein the oxide is laid down as a layer on the mica flakes, it is necessary that the precipitation of the hydrous oxide be relatively slow. This is conveniently done by the introduction of an acid accepting buffer salt of which sodium acetate and sodium tetraborate are preferred through any other buffer salt acting in the proper pH range, say about 4 to 7, may be used.

The concentrations of the metal salt solution may vary over a wide range say from as much as about 20% down to about 2% with a preference in the range of about 2 to 10%.

The amount of salt solution in relation to the mica is significant only as the means of controlling the amount of metal oxide deposited. To obtain acceptable nacreous pigments, the amount of oxide should be at least about 10% of the weight of the pigment and may range upward to 30% or even about 40%. Generally however, the preferred amounts of oxide deposited will be in the range of about 10-30% of the pigment. The actual amount of metal salt used in the solution may often exceed the calculated amount because it is sometimes difficult to obtain complete exhaustion of the solutions in the precipitation step, within the pH range dictated by the buffer salts used. However, more drastic increase of pH by adding stronger alkaline agents is undesirable as possibly precipitating free metal oxide.

Isolation of the pigments from the reaction mixture is conventional in every way. It is conveniently done by filtering, washing free of soluble salts and drying at any desired temperature, say about 80° C. Such products are valuable pigments but they may sometimes be improved in stability and altered somewhat in color by calcination in air at temperatures which may range from about 300-400° C. for the vanadium oxide ($V_2O_5$ melts at 690° C.) up to about 700° C. for the chromic oxide and iron oxide.

The products of this invention exhibit a very unusual and novel combination of color effects. In the first place, the metal oxide coatings are inherently colored, the colors of which vary with the type of oxide and with the degree of calcination. Thus, the hydrous iron oxide coatings are golden yellow in color, changing to a brown and ultimately to red on calcination. Hydrous chromic oxide coatings are greenish changing to lighter green on calcination. The hydrous oxide treated products containing vanadium are brownish gray changing to a brilliant light yellow on calcination at 300-400° C.

A very unusual and unexpected aspect of this invention is the limited range of only three colored metal oxides which can be deposited as layers directly on mica flakes and be retained in the particle size range required to give a nacreous character to the products. In a copending application, it is shown that many metal oxides can be deposited on mica previously treated with a layer of titanium or zirconium dioxides. Therefore, it was wholly unexpected to find that, of these oxides, only iron (III), chromium (III), and vanadium (V) oxides can be used directly on the mica to produce interference effects.

In addition to the inherent color of the oxide, these pigments exhibit interference colors of specified hues. Such colors are frequently called reflex colors. They are rather subtle and best observed under certain specific conditions. Generally, the powders in bulk show only the colors of the metal oxides. If the powder is spread in a thin film such as by rubbing between the fingers and observed in bright sunlight, it may show a pronounced sparkle with evidence of the reflex color in addition to the color of the oxide. If it is mixed with water on a black surface, the interference color and sparkle immediately become visible.

When dispersed in coating composition vehicles, plastics and the like, the reflex color is best observed at the specular angle under bright illumination as in the sunshine. Since this color generally differs from the inherent color of the oxide, spectacular two-tone effects are often obtained.

The hue of the interference color is a function of the thickness of the oxide film following the general rules set forth above. Measurements of the thickness of the film may be based upon the wave length of the interference maxima or minima observed and range from about 20 to about 100 millimicrons with the preferred products in the range of 35 to 75 millimicrons. Another measure of use of the metal oxide is found in the amount deposited per unit area of the mica surface. On this basis, the usage of metal oxide varies from about 35 mg. to about 200 mg. per square meter with a preferred range of about 40 to 100 mg. per square meter. Finally, another measure is the actual weight percent of the metal oxide based on the weight of the final pigment. This may vary from about 10% to about 40%, preferably about 10% to 30%. With the smaller amounts of metal oxide, say from about 10% to about 20%, the reflex colors are generally of a silvery nature becoming golden as the amount increases beyond about 20%. There is no arbitrary upper limit on the amount of metal oxide which may be deposited, but the practical operation indicates that amounts in excess of about 30% are difficult to deposit and that about 40% is a limit of practicality.

It appears that one of the critical features distinguishing the new products from the metal oxide pigments of the prior art lies in the character of the metal oxide deposited on the mica flakes. Examination of such flakes, both before and after calcination, in the electron microscope, suggests that the hydrous oxide films have particles so small as to be very poorly resolved in the electron microscope. They are not completely non-crystalline because they have distinguishable X-ray diffraction patterns and there is some evidence of very small particles, in the order of 0.01 micron in size, but these particles do not appear to have sharp edges and tend to be irregular in size and shape. Upon calcination, a definite crystalline patern becomes evident but, for products which are nacerous in character, the crystallites are extremely small and densely packed so that the optical character is that of a film. Measurement of these particles shows a maximum particle size of about 0.1 micron. However, there appears to be some limit on the temperatures above which the particles grow to sizes substantially greater than 0.1 mica micron and, when this occurs, the nacerous character disappears. The maximum permissible temperatures differ for the three oxides being about 800° C. for iron oxide, about 700° C. for chromium oxide, and about 500° C. for vanadium oxide. Such larger particles exhibit the light scattering properties of conventional metal oxide pigments.

In discussing the properties of these new pigments, emphasis has been placed on compositions in which they are used alone. However, they may be used in mixtures with other pigments. With black pigments such as carbon black, there is frequently some enhancement of the effect of the reflex color. In mixtures with conventional colored pigments of compatible hues, the nacerous character, and frequently the sparkle as well, are retained while the effect on the color is often unpredictable. Many combinations have an effect similar to that of aluminum flakes without many of the disadvantages of the aluminum flakes.

When the new flakes are used in admixtures with conventional pigments of high hiding power, such as pigmentary $TiO_2$ for instance, a pronounced nacerous, or pearl-like, character is quite evident even with as much as 25 to 50% of $TiO_2$, but the iridescent sparkle may be very much diminished. Nevertheless, such mixtures offer attractive possibilities to the formulator.

An outstanding property of the new flake pigments is their remarkable ease of dispersibility in coating composition vehicles. It has been considered necessary with substantially all pigments known to the art to subject them to considerable grinding action for the necessary degree of dispersion required in formulating high quality paints, enamels, and the like. Metal oxide pigments generally require substantial grinding to give acceptable enamels. Mica also requires considerable work on the system for good dispersion. It is, therefore, totally unexpected to find that the new pigments, whether calcined or not, can be dispersed in a great variety of vehicles by simple vigorous agitation. Additional grinding shows little, if any, advantage and can be easily carried to the point where the flakes are broken with an undesirable effect on the color obtained.

These new pigments have their principal value as ingredients of compositions such as paints, printing inks, plastic films, rubber articles, and the like, to which they impart color and other decorative effects and often exert a profound influence on the durability of such compositions on exposure to the elements. When the color and decorative properties of pigments are spoken of, it is generally understood that reference is being made to compositions containing the pigments of which the following are typical, but not limiting.

FORMULATION A.—UNSUPPORTED FILM OF CELLULOSE ACETATE 1.0 part of pigment is added to 20 parts of a cellulose acetate solution containing 16.7% cellulose acetate in acetone. The mixture is stirred until thoroughly mixed. A glass plate is prepared for stripping a film therefrom by coating the clean plate with a silicone stopcock grease and then wiping thoroughly with a dry cloth. The lacquer is spread on the glass plate and drawn down to a wet film thickness of about 0.16 mm. After the solvent has evaporated, the film is stripped from the plate and observed on the smooth side. Such films are conveniently used for light-fastness tests in a "Fade-Ometer."

FORMULATION B.—BAKED ACRYLIC LACQUER

| | Parts |
|---|---|
| Pigment | 2.5 |
| Mixed acrylic ester polymer (Acryloid A–101, Rohm and Haas) | 17.9 |
| Butyl benzyl phthalate | 7.7 |
| Monoacetate of ethylene glycol monoethyl ether | 20.0 |
| Methyl ethyl ketone | 56.9 |
| Toluene | 50.0 |

The pigment is dispersed by vigorous stirring with the resin and plasticizer together with a portion of the solvents for about 15 minutes; the remainder of the solvents is then added and the mixing continued until uniform. Exhibits are prepared by spraying onto primed panels and, after drying, baking at 80–85° C. for 20 minutes. Alternatively, as a quick testing method, films of this lacquer may be spread to uniform thickness with a "doctor blade" and observed after air drying.

FORMULATION C.—BAKED ALKYD ENAMEL

| | Parts |
|---|---|
| Pigment | 2.5 |
| Non-oxidizing coconut oil, modified alkyd resin solution (60% solids) | 29.2 |
| Modified melamine formaldehyde resin (55% solids) | 13.6 |
| Aromatic hydrocarbon solvent | 15.0 |
| Aliphatic hydrocarbon solvent | 19.0 |

The pigment is added to the mixed resin solutions with a part of the solvent and dispersed by high speed stirring for about 15 minutes after which the remainder of the solvent is stirred in. The resulting enamel is sprayed onto a primed metal panel and baked one half hour at about 120° C. Films of uniform thickness may also be applied with a "doctor blade."

FORMULATION D.—VINYL PLASTIC FILM

| | Parts |
|---|---|
| Pigment | 3 |
| Vinyl chloride polymer | 100 |
| Dioctyl phthalate | 40 |
| Polyester resin | 10 |
| Stabilizer (barium-cadmium-zinc phosphite) | 3 |
| Stearic acid | 0.25 |

The pigment is added to the mixture of ingredients and the whole mixture is processed on a two-roll mill, heated to 155° C., until uniform. It is finally taken from the mill as a sheet of any desired thickness which may be observed as obtained or may be press polished in a suitable heated press.

These compositions are all conventional and may be modified in well-known ways or may be replaced by equally conventional compositions including cellulose nitrate lacquers, linseed or other oleoresinous varnishes, linoleum compositions, rubber, polyethylene resins and the like.

In all cases, the observed color can be confirmed by optical measurements such as spectrophotometric reflectance curves which can be determined by measurements on dispersions of the colors over non-reflecting backgrounds.

In comparison with prior art colored flake pigments, the products of this invention offer the following notable advantages:

(1) They can be prepared and marketed as dry pigments.

(2) These dry pigments show a remarkable ease of dispersion in the compositions in which they are used.

(3) They show a nacreous effect of a degree not readily produced with prior art colored flake pigments.

(4) They offer a high degree of lightfastness.

(5) They are heat stable and can be used in baking enamels and in plastics processed at high temperature.

(6) They are completely non-bleeding in solvents and in the usual chemical agents to which coating compositions may be subjected.

(7) They are universally compatible with coating composition vehicles and plastic systems commonly met.

(8) They make possible tinctorial effects not heretofore obtainable.

Each of these advantages is in itself a notable advance over the prior art in the field of colored flake pigments and the combination of all of them in this new family of pigments is remarkable.

The following examples illustrate but do not limit the application of the principles of this invention. Unless otherwise designated, the term "parts" refers to parts by weight.

Example I 200 parts of $FeCl_3$ (anhydrous) is dissolved in 2000 parts of water at room temperature to which is added 40 parts of sodium acetate ($NaC_2H_3O_2$) and 100 parts of wet ground muscovite mica sold under the name "Concord Wet Ground Mica #200/325" which all passes through a 200 mesh screen and about 90% through a 325 mesh screen, has an average diameter of flake particles in the range of from about 10 microns to about 50 microns, and a surface area of about 3.2 square meters per gram. The mixture is heated rapidly to 70° C. while well stirred and held at about 70° C. for one hour. After heating for a few minutes, the mica flakes in the slurry take on the golden-yellow appearance of hydrous ferric oxide. When a sample of the slurry is diluted and observed against a black background, in addition to the overall golden yellow appearance, a brilliant colored sparkle appears as a reflex color from a bluish silver with a short heating period to a true silver at the end of heating. This reflex color is an interference color resulting from the deposition of the metal oxide film on the surface of the mica, the thickness of the film and, hence, the color, varying with increasing time of heating. At the end of the heating period, the product is filtered, washed free of chloride ions and dried. It contains 18.1% iron (as $Fe_2O_3$) and is a golden yellow powder which shows a brilliant sparkle when rubbed out to a thin film. When dispersed in a typical coating composition, as the alkyd enamel of Formulation C, and applied to a metal panel, the resulting light stable finish is golden yellow with a predominately silver reflex. When viewed under bright illumination, at the specular angle, a brilliant play of iridescent colors is also seen. When dispersed in an unsupported vinyl film (as in Formulation D) a brilliant golden, nacreous plastic composition is obtained.

It is apparent that the amount of iron oxide deposited influences the interference color and may be varied by variations in the time of heating or by variations in the amount used.

Example II

The iron oxide-coated flakes of Example I are calcined by heating in the air at temperatures within the range of about 400–700° C., the resulting overall color ranging from a brown at 400° C. to a purple at 600–700° C., and a silver reflex color at all temperatures. As calcination proceeds to higher temperatures, the interference color is lessened and largely disappears at temperatures above about 700° C. The product becomes a red pigment without nacreous character at 950° C. Examination under a microscope of the uncalcined flakes and those calcined in the lower temperature ranges reveals a uniform layer of metal oxide particles which are extremely small and indistinct in the uncalcined product. As the temperature is increased, the particles develop a distinct character, but remain below about 0.1 micron in size until the temperature exceeds about 700° C.

Example III 40 parts of chromic sulfate ($Cr_2(SO_4)_3.5H_2O$) is dissolved in 200 parts of water at room temperature and 100 parts of water ground white mica (average size 10–50 microns) is added. Powdered borax $$(Na_2B_4O_7.10H_2O)$$

is slowly added to the agitated slurry so that the pH of the slurry is maintained at about 5.0 to 5.5. Under these conditions, a hydrous chromium oxide is precipitated slowly and deposits preferentially on the surface of the mica flakes as a uniform thin film which results in an interference color that changes from gold to red to blue as the amount of hydrous chromic oxide precipitated increases. The addition of small portions of borax is continued until all of the chromic sulfate has been precipitated and the product is then filtered, washed free of sulfate ions and dried to give a light green powder (12% chromium as $Cr_2O_3$) with a blue reflex color when spread in a thin film as when rubbed between the fingers. When used to pigment a cellulose acetate film, as in Formulation A, the lightfast film has a light green color with a pronounced blue reflex. Examination of these flakes under the electron microscope shows the flakes to be uniformly covered with the hydrous oxide film.

Calcination of these coated flakes in air at 700° C. for ½ hour gives a green product of somewhat less intensity but with a silver-blue interference color. The particles of chromic oxide on the mica are less than 0.1 micron in diameter.

Example IV 40 parts of vanadyl sulfate ($VOSO_4.2H_2O$) is dissolved in 1600 parts of water at room temperature and 100 parts of wet ground white mica (Concord Wet Ground Mica #200/325) is added to the solution. While keeping the slurry well stirred, powdered borax $$(Na_2B_4O_7 \cdot 10H_2O)$$

is added in small increments at a rate sufficient to maintain the pH in the range 3.5–4.5 whereupon vanadium tetroxide is deposited on the mica flakes to give a brownish gray color in overall appearance together with an interference color which varies from silver to gold to red as the quantity of coating increases. The product is filtered, washed free of sulfate ions and dried to give brownish gray flakes. When these flakes are calcined in air at 300–400° C., they are transformed to light yellow flakes with an intense silver-blue reflex color. These yellow flakes have a coating of about 15% vanadium pentoxide ($V_2O_5$) resulting from the simultaneous calcination and oxidation of the hydrous tetroxide. The particles of vanadium pentoxide are less than about 0.1 micron in diameter. If the calcination temperature is increased substantially beyond 400° C., there is a pronounced tendency for particle growth and loss of nacreous character.

Articles pigmented with these yellow flakes exhibit a brilliant yellow color with a silver-blue reflex. They are light stable products.

*Examples V and VI*

The following examples illustrate the use of mixtures of the new nacreous flake pigments with conventional colored pigments to obtain highly attractive decorative effects.

*Example V*

ACRYLIC LACQUERS WITH MIXTURES OF PIGMENTS

These lacquers are based upon a vehicle blend consisting of

|  | Percent |
|---|---|
| Mixed acrylic ester Polymer (Acryloid A–101) | 85.4 |
| Butyl benzyl phthalate (as plasticizer) | 14.6 | and a solvent blend consisting of

|  | Percent |
|---|---|
| Monoacetate of ethylene glycol monoethyl ether | 20 |
| Methyl ethyl ketone | 30 |
| Toluene | 50 |

A copper phthalocyanine (CPC) blue acrylic lacquer (made in a conventional manner in a ball mill) consist of

|  | Parts |
|---|---|
| Copper phthalocyanine blue | 3.2 |
| Vehicle blend | 66.2 |
| Solvent blend | 30.6 |

The following mixed lacquers are then made:

|  | A, parts | B, parts |
|---|---|---|
| Golden Flake Pigment (Exam. I) | 4.75 | 4.75 |
| Vehicle Blend | 97.0 | 97.0 |
| CPC Blue Lacquer | 7.8 | 1.6 |
| Solvent Blend | 21.7 | 21.7 |

The ingredients are thoroughly blended by high speed agitation for 15 minutes, thinned with additional solvent blend to spraying consistency and sprayed with 3 double coats on a suitable panel.

In lacquer A, the golden flake/blue ratio is 95/5 and the resulting panel exhibits a highly pleasing "metallized" effect of a greenish hue and with a more pronounced sparkle than usually exhibited by lacquers containing aluminum flake. The effect is obtained over a fairly wide range of flake/color ratios up to as much as about 50/50.

In lacquer B, the golden flake/blue ratio is 99/1 and the resulting panel exhibits a bluish green toned nacreous effect with a brilliant iridescent sparkle under bright illumination.

*Example VI*

ALKYD ENAMEL WITH A MIXTURE OF PIGMENTS

A polychloro copper phthalocyanine (CPC green) enamel of the following composition is prepared by dispersion in a ball mill in the conventional manner:

|  | Parts |
|---|---|
| CPC green pigment | 5.0 |
| Non-oxidizing coconut oil-modified alkyd resin solution (60% solids) | 42.6 |
| Modified melamine formaldehyde resin (55% solids) | 20.0 |
| Aromatic hydrocarbon solvent | 16.2 |
| Aliphatic hydrocarbon solvent | 16.2 |

A portion of this enamel is mixed with a nacreous flake pigment as follows:

|  | Parts |
|---|---|
| Gold flake pigment (Example I) | 4.75 |
| CPC green enamel | 5.00 |
| Non-oxidizing coconut oil-modified alkyd resin solution (60% solids) | 58.4 |

These ingredients are mixed for 5 minutes by high speed agitation after which 27.2 parts of modified melamine formaldehyde resin (55% solids) is added and high speed agitation is continued for 5 minutes. The enamel is then reduced to spraying consistency with a 50/50 aromatic/aliphatic hydrocarbon mix and sprayed with 3 double coats onto a suitable panel. This enamel contains a gold flake/CPC green ratio of 95/5 and the color is much yellower than that of the CPC green enamel alone. In addition, the panels exhibit a lustrous golden sparkle.

The embodiments of the invention in which an exclusive property or privilege is claimed are defined as follows:

1. A pigment composition consisting essentially of translucent micaceous flakes having on the surface thereof a translucent layer of a colored metal oxide from the group of iron (III) oxide, chromium (III) oxide, vanadium (V) oxide, hydrous iron (III) oxide and hydrous chromium (III) oxide, said metal oxide layer constituting 10–40% by weight of the pigment.

2. The composition of claim 1 in which the metal oxide layer constitutes 10–30% by weight of the pigment.

3. The composition of claim 1 in which the micaceous flakes are white mica flakes.

4. A composition of claim 3 in which the white mica flakes have a surface area of 2–7 square meters per gram.

5. A pigment composition consisting essentially of translucent micaceous flakes having on the surface thereof a translucent layer of a colored metal oxide consisting essentially of particles selected from the group of iron (III) oxide particles, chromium (III) oxide particles, vanadium (V) oxide particles, hydrous iron (III) oxide particles and hydrous chromium (III) oxide particles, substantially all of which are less than 0.1 micron in particle size, said metal oxide layer constituting 10–40% by weight of the pigment.

6. The composition of claim 5 in which the metal oxide layer constitutes 10–30% by weight of the pigment.

7. A composition of claim 5 in which the micaceous flakes are white mica flakes.

8. The composition of claim 7 in which the white mica flakes have a surface area of 2–7 square meters per gram.

9. The composition of claim 5 in which the colored metal oxide is hydrous iron (III) oxide.

10. The composition of claim 5 in which the colored metal oxide is hydrous chromium (III) oxide.

11. The composition of claim 5 in which the colored metal oxide is chromium (III) oxide.

12. A pigment composition comprising a translucent micaceous flake substrate having on the surface thereof a translucent layer of a colored metal oxide selected from the group of iron (III) oxide, chromium (III) oxide, vanadium (V) oxide and the hydrous oxides of iron (III) and chromium (III), said compositions being colored nacreous flake pigments exhibiting the inherent color of the oxide coating and also exhibiting, under bright illumination, a lustrous sparkle with a characteristic reflex color varying from silver to gold with increasing thickness of the metal oxide layer.

References Cited in the file of this patent

UNITED STATES PATENTS

| | | |
|---|---|---|
| 834,739 | Lillienfeld | Oct. 30, 1906 |
| 2,332,220 | Harshberger | Oct. 19, 1943 |
| 2,995,459 | Soloway | Aug. 8, 1961 |
| 3,008,844 | Grunin et al. | Nov. 14, 1961 |